United States Patent [19]
Bongaerts et al.

[11] Patent Number: 5,835,167
[45] Date of Patent: Nov. 10, 1998

[54] PLASMA ADDRESSED LIQUID CRYSTAL DISPLAY WITH REDUCED COLUMN VOLTAGES

[75] Inventors: Petrus Franciscus Gerardus Bongaerts, Waalre; Jacob Bruinink, Eindhoven; Adrianus Leonardus Josephus Burgmans, Eindhoven; Henri Roger Jules Richard Van Helleputte, Eindhoven, all of Netherlands; Babar Ali Khan, Ossining, N.Y.; Karel Elbert Kuijk, Dommelen, Netherlands; Thomas Stanley Buzak; Kevin John Ilcisin, both of Beaverton, Oreg.; Paul Christopher Martin, Vancouver, Wash.

[73] Assignee: Philips Electronics North America, New York, N.Y.

[21] Appl. No.: 361,087

[22] Filed: Dec. 21, 1994

[51] Int. Cl.$^6$ .......................... G02F 1/333; G02F 1/1335; G02F 1/1343; G09G 3/28
[52] U.S. Cl. ............................ 349/32; 345/60; 349/106; 349/143
[58] Field of Search .................. 359/54, 55, 68; 345/58, 60; 427/162, 164; 349/143, 106, 32

[56] References Cited

U.S. PATENT DOCUMENTS

| | | | |
|---|---|---|---|
| 4,528,073 | 7/1985 | Sano et al. | 204/15 |
| 4,744,635 | 5/1988 | Takaochi et al. | 359/68 |
| 4,896,149 | 1/1990 | Buzak et al. | 340/794 |
| 5,077,553 | 12/1991 | Buzak | 340/794 |
| 5,177,627 | 1/1993 | Ishiwata et al. | 359/68 |
| 5,244,427 | 9/1993 | Umeya | 445/24 |
| 5,272,472 | 12/1993 | Buzak | 345/60 |
| 5,276,384 | 1/1994 | Martin | 313/582 |
| 5,305,154 | 4/1994 | Sumi et al. | 359/68 |
| 5,399,374 | 3/1995 | Sumi et al. | 427/162 |
| 5,408,245 | 4/1995 | Kakizaki | 345/60 |
| 5,414,440 | 5/1995 | Ilcisin et al. | 345/58 |
| 5,420,707 | 5/1995 | Miyazaki | 359/54 |
| 5,461,395 | 10/1995 | Stein | 345/60 |
| 5,499,122 | 3/1996 | Yano | 359/51 |
| 5,519,520 | 5/1996 | Stoller | 359/55 |

FOREIGN PATENT DOCUMENTS 0614168  9/1994  European Pat. Off. .

OTHER PUBLICATIONS

Buzak et al, "A 16–Inch Full Color Plasma Addressed Liquid Crystal Display", Digest of Tech. Papers, 1993 SID Int. Symp. Soc. for Info. Disp. pp. 883–886.

Primary Examiner—William L. Sikes
Assistant Examiner—Toan Ton
Attorney, Agent, or Firm—John C. Fox

[57] ABSTRACT

A plasma-addressed liquid crystal color display device comprising a layer of liquid crystal material, data electrodes coupled to the liquid crystal layer and adapted to receive data voltages for activating pixels of the liquid crystal layer, and a plurality of ionizable-gas-filled plasma channels extending generally transverse to the data electrodes for selectively switching on said liquid crystal pixels. The plasma channels are sealed off by a thin dielectric sheet, and a color filter layer is provided in the device through which changes in the attenuation of the liquid crystal pixels may be viewed to obtain a color image. To reduce the magnitude of the data voltages needed to activate the device, the device layers are configured and given compositions such that a much higher fraction of the applied data voltages appears across the liquid crystal layer thereby allowing a smaller data voltage to be used to obtain the same effect on the liquid crystal pixels. Another feature of the invention includes location of the color filter between the substrate supporting the column electrodes and the column electrodes. Still a further feature is a color filter made up of dyed porous segments of an anodized aluminum film, or of evaporated pigment segments.

18 Claims, 6 Drawing Sheets

PLASMA ADDRESSED LIQUID CRYSTAL DISPLAY WITH REDUCED COLUMN VOLTAGES

RELATED APPLICATIONS

1) Commonly-assigned application, Ser. No. 08/361,079, filed Dec. 21, 1994 in the names of the same applicants (PHA 60,085).

2) Commonly-assigned application, Ser. No. 08/361,078, filed Dec. 21, 1994 in the names of the same applicants (PHA 60,086).

BACKGROUND OF INVENTION

This invention relates to plasma-addressed liquid crystal display panels commonly referred to as "PALC" display devices. These devices comprise, typically, a sandwich of: a first substrate having deposited on it parallel transparent column electrodes, commonly referred to as "ITO" columns or electrodes since indium-tin oxides are typically used, on which is deposited a color filter layer; a second substrate comprising parallel sealed plasma channels corresponding to rows of the display crossing all of the ITO columns each of which is filled with a low pressure ionizable gas, such as helium, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is unnecessary because the construction, fabrication, and operation of such PALC devices have been described in detail in the following U.S. and foreign patents and publication, the contents of which are hereby incorporated by reference: U.S. Pat. Nos.4, 896,149; 5,077,553; 5,272,472; 5,276,384; EP 0 614 168 A1; and Buzak et al., "A 16-Inch Full Color Plasma Addressed Liquid Crystal Display", Digest of Tech. Papers, 1993 SID Int. Symp., Soc. for Info. Displ. pp. 883–886.

A problem in the known construction is that too large a column voltage is required for full activation of a LC pixel. Typical driving voltages required with the known construction such as described in the SID Digest 93 publication are in the range of 80–100V.

SUMMARY OF INVENTION

An object of the invention is an improved PALC display device.

Another object of the invention is a PALC display device requiring lower column driving voltages than were heretofore required.

Another object of the invention is a PALC color display device requiring reduced column voltages for reliable operation.

In accordance with a first aspect of the invention, a PALC display device construction is provided which greatly increases the fraction of the applied column voltage that appears across the LC pixel elements.

In accordance with another aspect of the invention applicable to color displays, the color filter needed to produce the typical red, green and blue hues from each black and white LC pixel, contrary to the known constructions, is provided above the column electrodes and thus outside of the region between the column electrodes and the plasma channels. From a different aspect, the ITO column electrodes are provided between the LC layer and the color filter.

In accordance with a further aspect of the invention, a novel color filter is provided in such a manner that less column voltage is dissipated across the color filter even when located in the region between the column electrodes and the plasma channels. Preferred embodiments in accordance with this aspect of the invention include color filter segments provided by evaporation of color pigments, and color filter segments provided by dying porous anodized aluminum segments.

In accordance with a further preferred embodiment of the invention, the dielectric constant at saturation of the LC layer is selected to be low, preferably below about 4.5, or an LC layer is selected whose transmission vs. voltage characteristic curve falls steeply between 99% and 1% transmission, preferably with a low threshold voltage.

In a further preferred embodiment of the invention, the thickness of the thin dielectric sheet is selected below about 40 μm and its dielectric constant is maintained above about 6.

In a further preferred embodiment of the invention, the thickness of the color filter is selected below about 3 μm and its dielectric constant maintained above about 5.

PALC display devices constructed in accordance with the invention will increase the fraction of the column voltage effective across the LC pixel elements by a factor of at least 3.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention, like reference numerals or letters signifying the same or similar components.

DETAILED DESCRIPTION OF PREFERRED EMBODIMENTS

Figure 1:
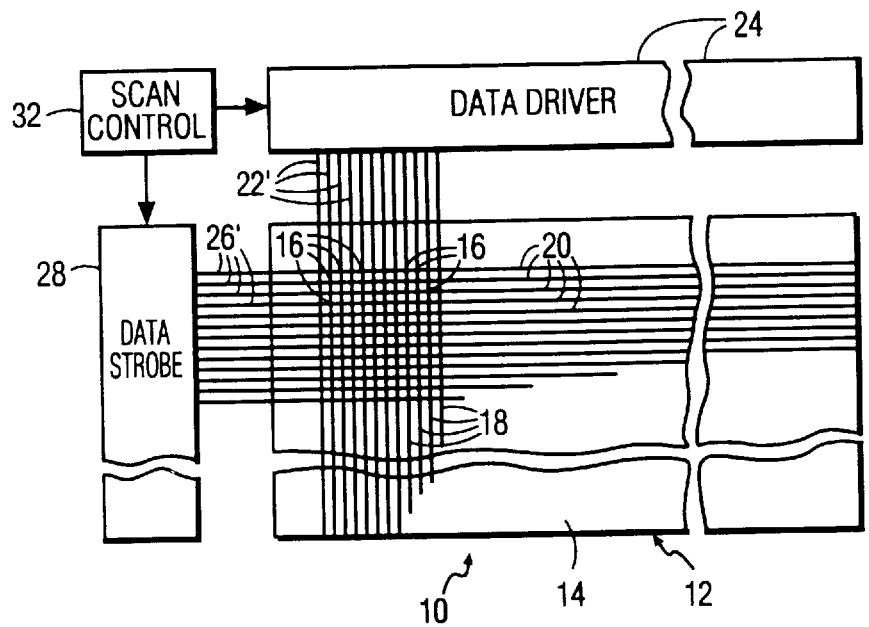
FIG. 1 is a schematic block diagram of a conventional flat panel display system.

FIG. 1 shows a flat panel display system 10, which represents a typical PALC display device and the operating electronic circuitry. With reference to FIG. 1, the flat panel display system comprises a display panel 12 having a display surface 14 that contains a pattern formed by a rectangular planar array of nominally identical data storage or display elements 16 mutually spaced apart by predetermined distances in the vertical and horizontal directions. Each display element 16 in the array represents the overlapping portions of thin, narrow electrodes 18 arranged in vertical columns and elongate, narrow channels 20 arranged in horizontal rows. (The electrodes 18 are hereinafter referred to from time to time as "column electrodes"). The display elements 16 in each of the rows of channels 20 represent one line of data.

The widths of column electrodes 18 and channels 20 determine the dimensions of display elements 16, which are typically of rectangular shape. Column electrodes 18 are deposited on a major surface of a first electrically nonconductive, optically transparent substrate 34, and the channel rows are usually built into a second transparent substrate 36. Skilled persons will appreciate that certain systems, such as reflective display of either the direct view or projection type, would require that only one substrate be optically transparent.

Column electrodes 18 receive data drive signals of the analog voltage type developed on parallel output conductors 22' by different ones of output amplifiers 23 (FIG. 2) of a data driver or drive circuit 24, and channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, display system 10 employs a scan control circuit 32 that coordinates the functions of data driver 24 and data strobe 28 so that all columns of display elements 16 of display panel 12 are addressed row by row in row scan fashion. Display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as LC materials. A color filter (not shown) may be positioned within display panel 12 to develop multi-colored images of controllable color intensity. For a projection display, color can also be achieved by using three separate monochrome panels 12, each of which controls one primary color.

Figure 2:
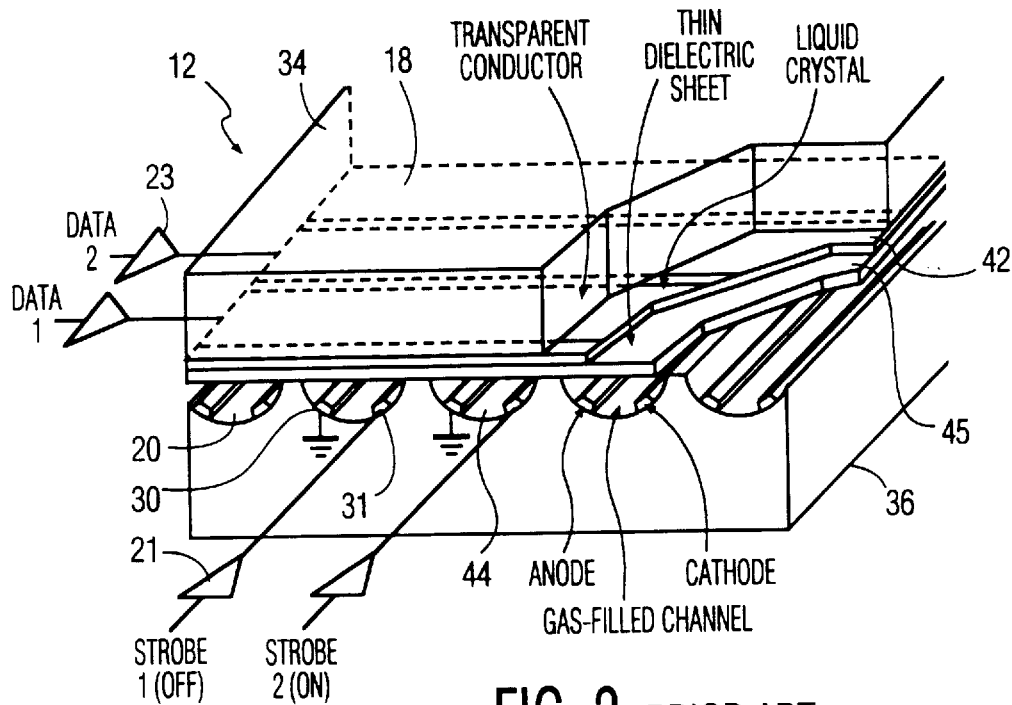
FIG. 2 is a perspective view of part of a conventional PALC display device.

FIG. 2 illustrates the PALC version of such a display panel using LC material. Only 3 of the column electrodes 18 are shown. The row electrodes 20 are constituted by a plurality of parallel elongated sealed channels underlying (in FIG. 2) a layer 42 of the LC material. Each of the channels 20 is filled with an ionizable gas 44, closed off with a thin dielectric sheet 45 typically of glass, and contains on an interior channel surface first and second spaced elongated electrodes 30, 31 which extend the full length of each channel. The first electrode 30 is grounded and is commonly called the anode The second electrode 31 is called the cathode, because to it will be supplied relative to the anode electrode a negative strobe pulse sufficient to cause electrons to be emitted from the cathode 31 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cross a whole column of pixels, only one plasma row connection at a time is allowed on to avoid crosstalk.

Figure 3:
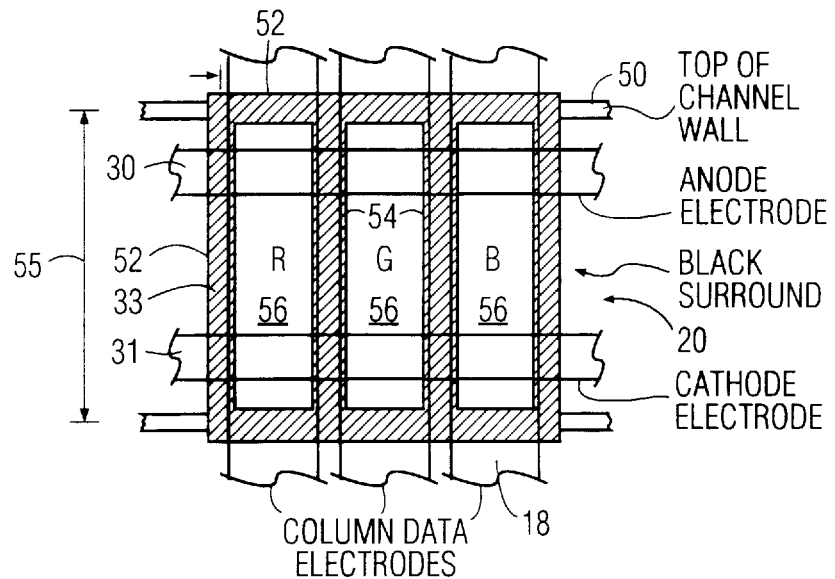
FIG. 3 is a view from the top of a single pixel of a PALC color display device.

FIG. 3 is a view from the top showing the layout of a pixel when a typical color filter is present. The view in FIG. 3 is rotated 90° C. so that the column electrodes 18 now extend vertically in the drawing, and the channel 20 extends horizontally from left to right. Reference numerals 50 designate the substrate ridges flanking each hemicylindrical channel. Black masking 52 surrounds each pixel, and black masking 54 divides each pixel into three sections each underlying a striped segment 56 of a color filter corresponding to the typical red, green and blue colors. The masking restricts visibility of a viewer, usually positioned on the column electrode side, to each LC pixel via its color filter section 56 as back-lighted from a light source behind the plasma channel side. The transparency of the LC pixel is determined by the stored data voltage in its inherent capacitance. The aperture is the ratio of the transparent area of the pixel to its total area, which is typically about 40%. A typical pixel size 55 is about 0.5 mm representing the spacing between the channel ridges 50 and the length of the perpendicular block surround side 52.

Fabrication of an PALC device is typically done by providing first and second substrates 34, 36 with the first substrate 34 comprising a glass panel on which is vapor-deposited the ITO column electrodes 18, followed by color filter processing over the ITO electrodes to produce the RGB stripes 56, followed by the black surround processing and liquid crystal alignment processing. The second substrate 36, also a glass panel, is masked and etched to form the channels 20, following which the plasma electrode material is deposited and masked and etched to form the anode 30 and cathode 31 electrodes. A thin dielectric glass microsheet 45 is then sealed across the channel ridges 50 to seal off the channels 20, which are then exhausted, back-filled with a low-pressure ionizable gas such as helium, and sealed off. The LC alignment layer is then deposited onto the exposed surface of the microsheet 45. The two assembled substrates are then assembled into a panel with the two LC alignment surfaces spaced apart and facing, the LC material 42 introduced into the space, and electrical connections made to the column electrodes 18 and plasma electrodes 30, 31.

Figure 4:
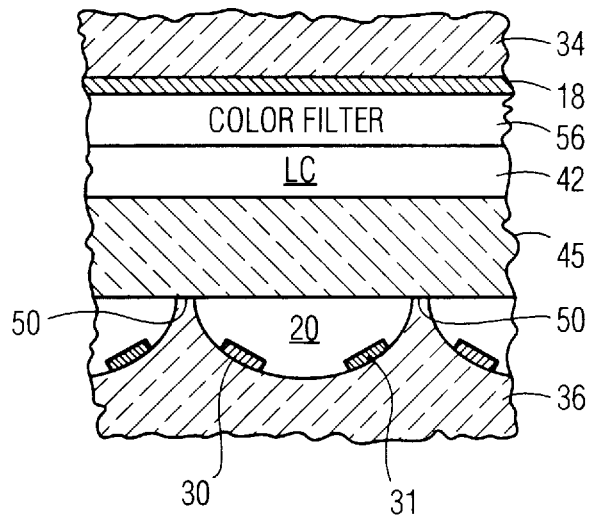
FIG. 4 is a cross-section of a channel of a prior art PALC display device to illustrate the performance of such a device.

FIG. 4 is a schematic, simplified view of a cross-section through a single pixel with a color filter 56 present. The current PALC color panels use a 50 µm thin sheet 45 of glass having a dielectric constant of about 6, color filters 56 typically of gelatine, polyimides, and organic acrylic based materials having a thickness of about 2–3 µm but usually with a planarizing topcoat resulting in an overall thickness of about 5 µm and a typical dielectric constant of about 3, and a typical LC material like ZLI4277 from E. Merck of Darmstadt, Frankfurt, Germany, of a thickness of about 4 µm and a typical mean dielectric constant of about 5.1. Assuming now that a plasma has been fired in the channel 20 so that the channel is effectively at a reference such as ground potential, and a column voltage $V_{ito}$ is then applied to the ITO column 18, it turns out that the effective voltage across the LC pixel region between the electrode 18 and the plasma channel 20, which voltage is responsible for determining the extent of the LC's attenuation for light, is only about 0.074 $V_{ito}$. Hence, when, say, 100 V is used as the driving voltage, only about 7V is effective across the LC pixel region.

A feature of our invention is based upon the realization that at the frequencies of the data voltages commonly applied to the ITO data electrodes, the voltage division between the ITO electrode and the plasma channel is of a capacitive nature. Based upon this understanding, we have found that the fraction of the data voltage actually applied directly across the LC pixel and controlling its attenuation can be increased by a factor of at least 3, in accordance with an aspect of our invention, by changing the construction of the PALC display such that:

(a) the color filter thickness is below about 3 µm, and preferably below about 1 µm, (b) the color filter dielectric constant is above about 5 and preferably in the range of about 7–9, (c) the LC layer has a thickness above about 61 µm and preferably in the range of about 6–8 µcm, (d) the LC dielectric constant is below about 4 and preferably in the range of about 2–4, (e) the thickness of the thin dielectric sheet is below about 40 µm and preferably in the range of about 20–40 µm.

Each of these constructional changes (a)–(e), used alone, will increase the fraction of the applied voltage active across the LC layer. Combinations of any two or more, including all five, changes will give even more striking improvements in performance.

Figure 5:
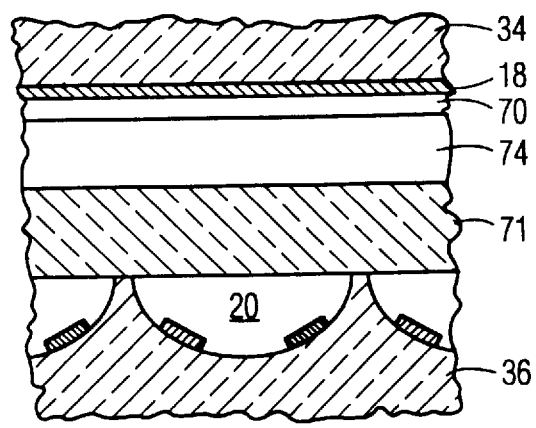
FIG. 5 is a cross-section of a channel of a PALC display device in accordance with the invention.

FIG. 5 illustrates one form of PALC device in accordance with the invention, wherein the thickness of the color filter 70 and/or dielectric sheet 71 are reduced to values within the ranges indicated above, and/or the LC layer thickness 74 is increased to within the range indicated above, and with one or more of the various materials chosen to have the dielectric constants indicated above.

If all five of the constructional parameters indicated above are adopted, the fraction of applied voltage $V_{ito}$ actually appearing across each LC pixel can be increased from less than about 1/10 $V_{ito}$ to 0.2 $V_{ito}$ or higher. If we assume that 10V is needed to activate the LC pixel over its full range, it will be appreciated that a column voltage, Vito, of only 20V or less would be required for driving a PALC device according to the invention.

A LC material with a thickness exceeding 68 µm can be provided by using a LC material that has a Δn of 0.07 or less, Δn being the birefringence of the LC material. With a Δn=0.07, the product of Δn and the LC layer thickness should equal about 0.48 in order to operate in the first Gooch and Tarry minimum. Thus, the thickness of the LC layer can be increased to at least about 6.9. Examples of such LC materials with a Δn of 0.07 or less are ZLI 1695 and ZLI 3125 available from the aforesaid E. Merck. It is also preferred that the LC material chosen should have a dielectric constant at saturation of 4.5 or less. By dielectric constant at saturation is meant the dielectric constant of the material when its transmission is 1%. LC materials with this property suitable for use in the invention include MP 88-1068 of E. Merck.

Figure 9:
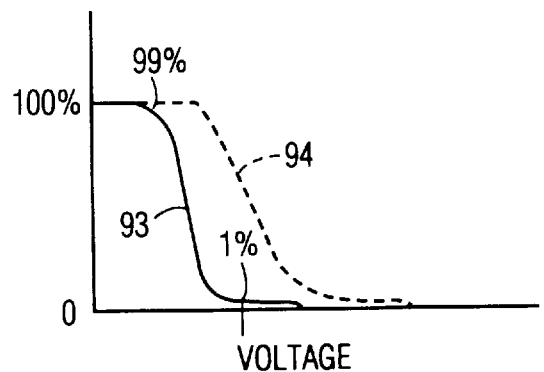
FIG. 9 is the characteristic curve of transmission vs. voltage for LC materials.

FIG. 9 shows the typical characteristic curve of transmission vs. voltage for LC materials. The significant points, as indicated in FIG. 9, are the voltage at which the transmission falls to 99% and the voltage at which the transmission falls to 1%, referred to herein for convenience as saturation. The dielectric constant of the LC material differs at the two points, and the mean dielectric constant usually refers to its average value. For the present invention, the dielectric constant at the 1% transmission point is the important value.

As indicated above, a preferred embodiment of the invention employs a LC material whose dielectric constant at saturation is preferably below 4.5, whereas another preferred embodiment of the invention employs a LC material whose characteristic curve of transmission vs. voltage falls steeply between the 99% and the 1% transmission points. In FIG. 9, the curve labelled 93 is an example of the steeply-falling characteristic desired for a LC material in accordance with one of the embodiments, which is typical of materials such as ZLI 4801-065 from E. Merck. Such a material has a dielectric constant at saturation of 6.17. The dashed curve labelled 94 is typical of an LC material with a low dielectric constant at saturation in accordance with another of the embodiments, such as MP 88-1068 from E. Merck, whose dielectric constant is 3.13. Either of these types of LC materials substituted for those conventionally employed in PALC types of displays will result in an improvement in the effective voltage applied across the LC pixel, and the improvement is increased when the LC layer thickness is reduced below 5 µm. As an example, a thickness of about 4.3 µm is preferred.

Figure 6A:
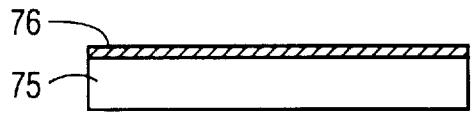
FIGS. 6A–6M illustrate the fabrication of one form of a color filter for a PALC display device in accordance with the invention.
Figure 6B:
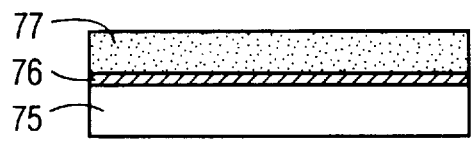
Figure 6C:
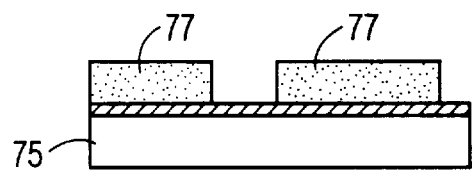
Figure 6D:
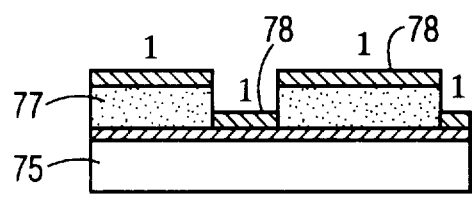
Figure 6E:
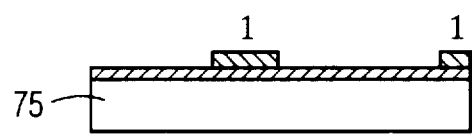
Figure 6F:
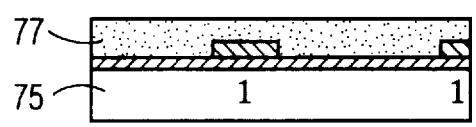
Figure 6G:
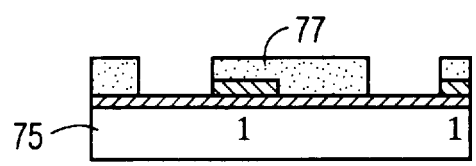
Figure 6H:
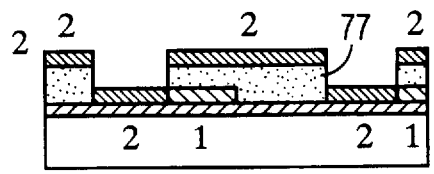
Figure 6I:
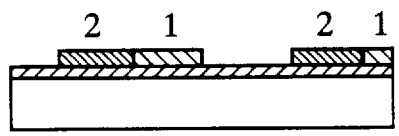
Figure 6J:
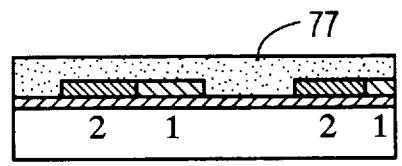
Figure 6K:
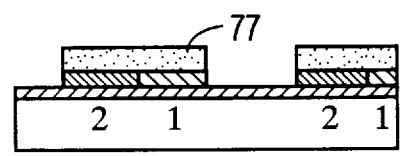
Figure 6L:
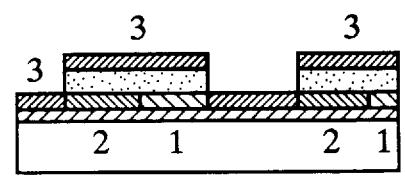
Figure 6M:
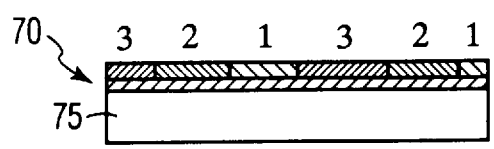

FIGS. 6A–6M illustrates a preferred method in accordance with the invention for making a color filter 70 having a thickness below about 1 µm and as low as 0.5 µm. The preferred method involves pigment evaporation onto the substrate previously covered with the ITO electrodes, followed by a liftoff technique. FIGS. 6A–6M illustrate the process but for simplicity the ITO columns have been omitted. Starting with a substrate 75 previously covered with the ITO electrodes (not shown), a suitable photoresist (PR) adhesion promoter 76 such as silane is applied (FIG. 6A), followed by coating with a thin layer 77 of the PR in the conventional way (FIG. 6B). The PR layer is baked and patterned for pigment color 1 (FIG. 6C), which is then vacuum evaporated 78 (FIG. 6D). Next, the PR 77 is lifted off by application of a standard solvent, leaving behind the pigment 1 in the desired pattern (FIG. 6E). The procedure is repeated for pigments 2 and 3 in the succeeding FIGS. 6F–6M. A detailed procedure, which is not intended to be limiting of the invention, follows below:

(1) attachment of the silane adhesion promotor on an UV/ozone cleaned substrate of indium-tin oxide (ITO) on glass with:
  gasphase reaction
  temperature 125° C.
  pressure about $1^{-2}$ torr (2) spin-coating of 1.3 µm HPR 204 photoresist on the glassplate (3) drying of resist layer for half an hour at 90° C.

(4) photolithographic structuring (contact exposure)

(5) drying of resist for half an hour at 120° C.

(6) vacuum evaporation of blue pigment
substrate at room-temperature
temperature 250°–350° C.
evaporation pressure about $1^{-5}$ torr (7) lift-off of resist (and blue pigment overhead) in ethanol (8) rinsing and drying of the structured colour filter in ethanol soxlet (9) repeat steps (2)–(5)

(10) vacuum evaporation of red pigment
substrate at room-temperature
temperature 250°–300° C.
evaporation pressure about $1^{-5}$ torr

(11) repeat steps (7)–(9)

(12) vacuum evaporation of cyan pigment
substrate at room-temperature
temperature 200°–300° C.
evaporation pressure about $1^{-5}$ torr

(13) vacuum evaporation of yellow pigment
substrate at room-temperature
temperature 200°–300° C.
evaporation pressure about $1^{-5}$ torr

(14) repeat steps (7)–(8)
blue pigment=pigment color 1
red pigment=pigment color 2
green pigment=cyan pigment+yellow pigment= pigment color 3

Examples of suitable pigments that when processed as described above will have a thickness below about 1 μm for the blue pigment, Cu-phthalo cyanine, thickness 0.45 μm; for the red pigment, perylene, thickness 0.38 μm; for the cyan pigment, Vanadyl-phtalocyanine, and for the yellow pigment, Irgalite yellow, combined thickness of 0.42 μm.

The invention is not limited to the particular pigments used in the example given above and any pigments that will provide the basic colors needed to provide a color display, that can be evaporated to produce a layer not exceeding about 1 μm and/or having a dielectric constant of at least about 5 can be substituted.

Figure 7A:
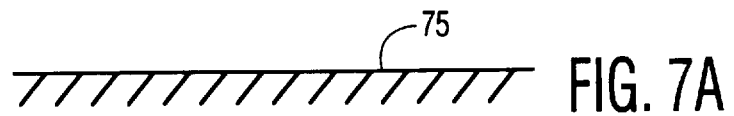
FIGS. 7A–7G illustrate the fabrication of another form of a color filter for a PALC display device in accordance with the invention.
Figure 7B:
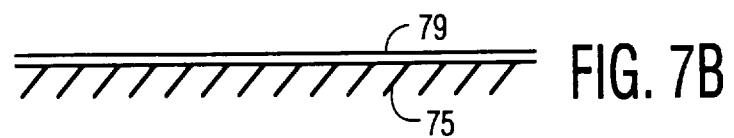
Figure 7C:
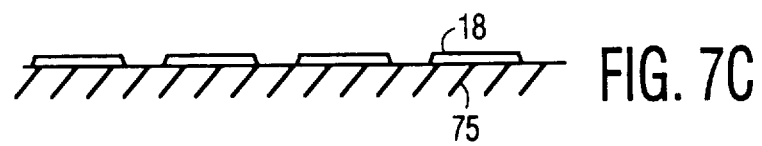
Figure 7D:
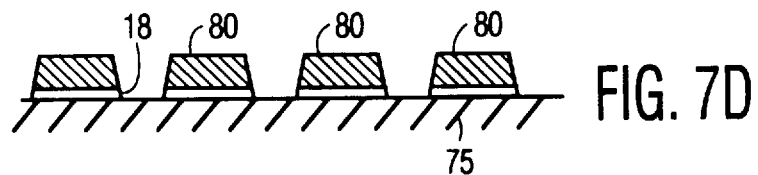
Figure 7E:
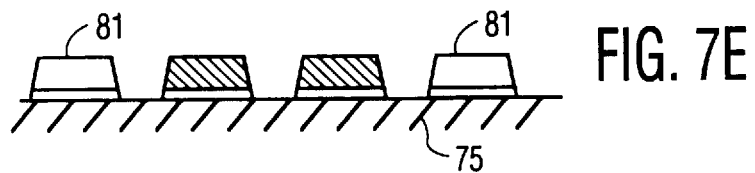
Figure 7F:
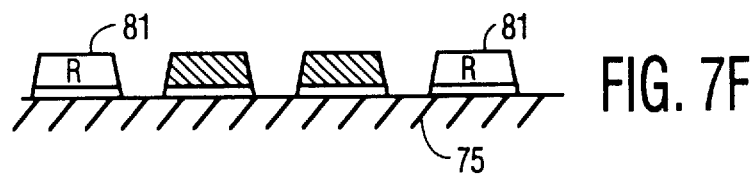
Figure 7G:
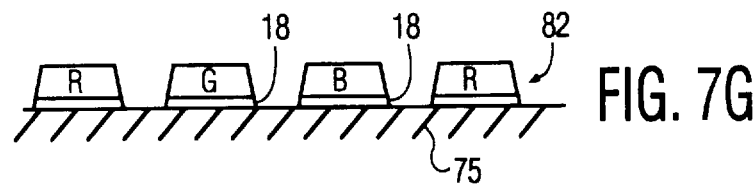

As indicated above, a thin color filter layer with a dielectric constant above about 5 and preferably in the range of 7–9, used alone, will assist in increasing the fraction of $V_{ito}$ applied across the LC layer. Another preferred method for achieving a color filter with this property is by using selectively dyed anodized aluminum segments of an evaporated Al film over the ITO-covered substrate. One way of carrying out such a method is illustrated in FIGS. 7A–7F. First, a glass substrate 75 (FIG. 7A) is covered with an evaporated ITO film 79 (typical thickness of 150 nm) (FIG. 7B), which is then paterned and etched in the usual way to produce the ITO column electrodes 18 (FIG. 7C). Next, a thin layer of aluminum is evaporated (typical thickness of about 1000 nm) over the ITO electrode columns 18 and patterned and etched in the usual way leaving Al columns 80 in place on top of the ITO columns 18 (FIG. 7D). Next, for the first color, say red, every third Al column 80 is selectively anodized to convert same to porous aluminum oxide 81. A conventional anodization process can be used, for example, in 15% sulphuric acid, while the intervening two Al columns are masked (not shown) with any suitable masking material (FIG. 7E). Subsequently, the subassembly is subjected to a red dye which is absorbed only by the porous anodized regions 81 FIG. 7F). The process is then repeated with green and blue dyes, starting from FIG. 7E by selectively anodizing another set of Al columns and dying with a green dye and repeating with a blue dye resulting in the layout shown in FIG. 7G. The use of an evaporated film, in this case of aluminum, allows the thickness of the resulting color filter 82 to be kept small, within the range indicated above, and the feature of anodizing it to make selective segments porous allows it to selectively absorb the different dyes needed to reproduce full color and results in a dielectric constant above about 5 and preferably within the range stated above. For this particular example, the dielectric constant will be about 8.5. The combination of a much thinner color filter layer with a higher dielectric constant, even without any of the other changes in thickness or dielectric constant indicated for the dielectric sheet and LC layer, will produce an improvement by a factor of at least 10 in effective voltage across the LC layer. Reference is made to U.S. Pat. No. 4,717,457, whose contents are incorporated herein by reference, which describes other ways of making thin porous oxide layers which can be dyed different colors to serve as a color filter for a PALC display.

In the previous examples, the color filter was provided in the usual way over the ITO column electrodes on the first substrate. In accordance with still another feature of the present invention, the color filter layer is provided on the first substrate and then the ITO electrodes deposited on the color filter. The anodized aluminum color filter described above is particularly useful in this embodiment because it provides a reasonably firm base for deposition of the ITO electrodes in the normal way by vapor deposition. The process described above for the fabrication of the dyed anodyzed aluminum color filter can also be used when the glass substrate is free of the ITO column electrodes. By omitting the color filter from between the ITO electrodes and the plasma channels, none of the applied column voltage is dissipated across the color filter and thus a larger fraction remains effective across the LC pixels. This aspect of the invention is not limited to an anodyzed aluminum color filter and other color filter materials which when deposited on the substrate will provide a suitable base for deposition of the ITO electrodes can be substituted.

Figure 8:
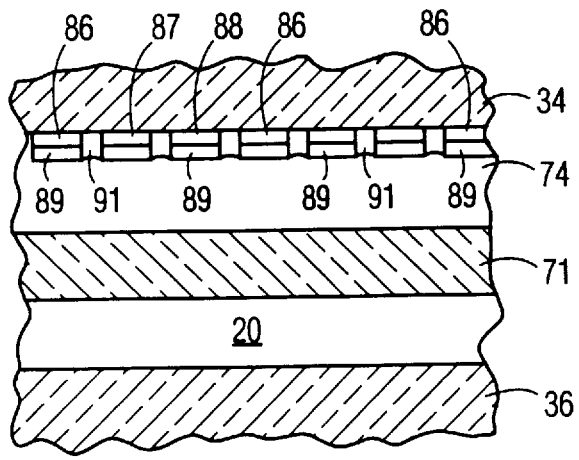
FIG. 8 is a cross-section similar to FIG. 5 of another form of a PALC display device in accordance with the invention.

FIG. 8 illustrates this embodiment of the invention, and shows the first substrate 34 on which is formed the anodized aluminum segments dyed red 86, green 87, and blue 88, respectively, each covered with an ITO column electrode 89, the spaces between the columns filled with an inert planarizing material 91, and the usual LC layer 74, dielectric sheet 71, and channel substrate 36 provided as previously described.

For the dielectric sheet material to be used in the PALC device of the invention, it is preferred to use known glass materials that have a typical dielectric constant of about 6.7 provided in a thickness of at most 40 μm, preferably about 30 μm. An example of such a glass is a D263 glass fom the Schott Company.

All of the methods described in the referenced patents and publication will be suitable for making the channels and electrodes for the panel of the invention.

The invention can be used in all kinds of PALC displays that typically have a small channel pitch for use in computer monitors, workstations or TV applications.

While the invention has been described in connection with preferred embodiments, it will be understood that modifications thereof within the principles outlined above will be evident to those skilled in the art and thus the invention is not limited to the preferred embodiments but is intended to encompass such modifications.

What is claimed is:

1. A plasma-addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, a dielectric sheet closing off the plasma channels on the side facing the data electrodes, and a color filter associated with the liquid crystal layer, said plasma channels each comprising spaced elongated cathode and anode plasma electrodes and an ionizable gas filling, wherein the liquid crystal layer is located between the data electrodes and the plasma channels, and the thickness of the liquid crystal layer is above about 6 $\mu$m.

2. The device of claim 1, wherein the liquid crystal layer has a dielectric constant below about 4.5 at a transmission of 1%.

3. The device of claim 2, wherein the dielectric sheet has a thickness below about 40 $\mu$m.

4. The device of claim 3, wherein the color filter is located between the data electrodes and the plasma channels and has a dielectric constant of at least about 5 and a thickness of at most about 3 $\mu$m.

5. A plasma-addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, a dielectric sheet closing off the plasma channels on the side facing the data electrodes, and a color filter associated with the liquid crystal layer, said plasma channels each comprising spaced elongated cathode and anode plasma electrodes and an ionizable gas filling, wherein the dielectric sheet has a thickness below about 40 $\mu$m.

6. The device of claim 5, wherein the liquid crystal layer has a dielectric constant below about 4.5 $\mu$m at a transmission of 1%.

7. The device of claim 6, wherein the liquid crystal layer has a thickness about 6–8 $\mu$m.

8. The device of claim 7, wherein the color filter is located between the data electrodes and the plasma channels and has a dielectric constant of at least 7 and a thickness of at most 1 $\mu$m.

9. A plasma-addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, a dielectric sheet closing off the plasma channels on the side facing the data electrodes, and a color filter associated with the liquid crystal layer, said plasma channels each comprising spaced elongated cathode and anode plasma electrodes and an ionizable gas filling, wherein the color filter has a thickness below about 3 $\mu$m.

10. The device of claim 9, wherein the color filter has a thickness below about 1 $\mu$m.

11. The device of claim 9, wherein the color filter comprises porous color segments.

12. The device of claim 11, wherein the color segments are evaporated color pigments.

13. The device of claim 9, wherein the color filter comprises color-dyed porous color segments.

14. The device of claim 13, wherein the porous color segments are anodized aluminum.

15. A plasma-addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions, and a color filter associated with the liquid crystal layer, said plasma channels each comprising spaced elongated cathode and anode plasma electrodes and an ionizable gas filling, wherein the color filter comprises a thin film of porous anodized aluminum with adjacent porous segments filled with one of two or more color dyes which when combined are capable of producing a color image, wherein the dyed-porous anodized aluminum segments are vapor-deposited and have a dielectric constant of greater than about 5.

16. The device of claim 15, wherein the anodized aluminum is vapor-deposited and has a thickness of less than about 3 $\mu$m.

17. A device of claim 15, wherein the adjacent porous segments comprise one of three dyes and are physically separated.

18. A plasma addressed liquid crystal display device comprising a layer of liquid crystal material, data electrodes coupled to the liquid crystal layer and adapted to receive data voltages for activating portions of the liquid crystal layer, a plurality of elongated plasma channels extending generally transverse to the data electrodes for selectively switching on said liquid crystal portions and a color filter associated with the liquid crystal layer, said plasma channels each comprising spaced elongated cathode and anode plasma electrodes and an ionizable gas filling, wherein the color filter comprises a thin film of adjacent evaporated pigments arranged in a cyclical pattern of plural colors which when subjected to light are capable of producing a color image wherein the color filter has a thickness below 1 $\mu$m.

* * * * *